March 15, 1949.   E. W. PATTERSON   2,464,710
COMPENSATING PISTON LUBRICATOR
Filed June 30, 1947
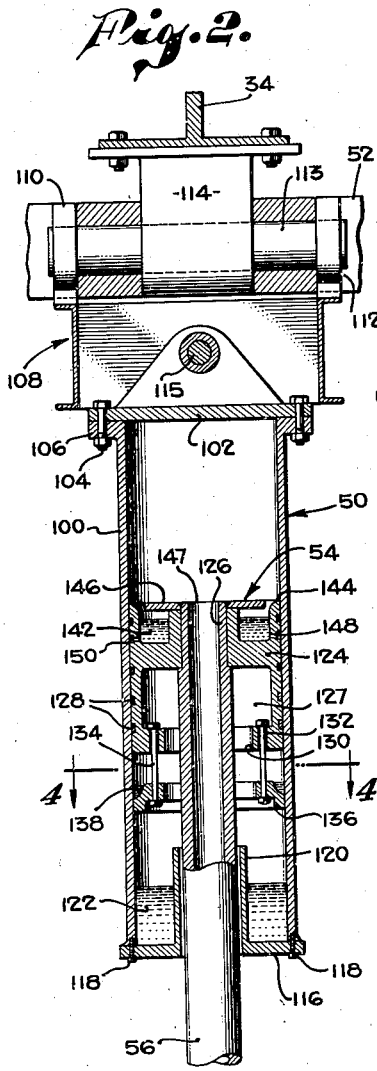
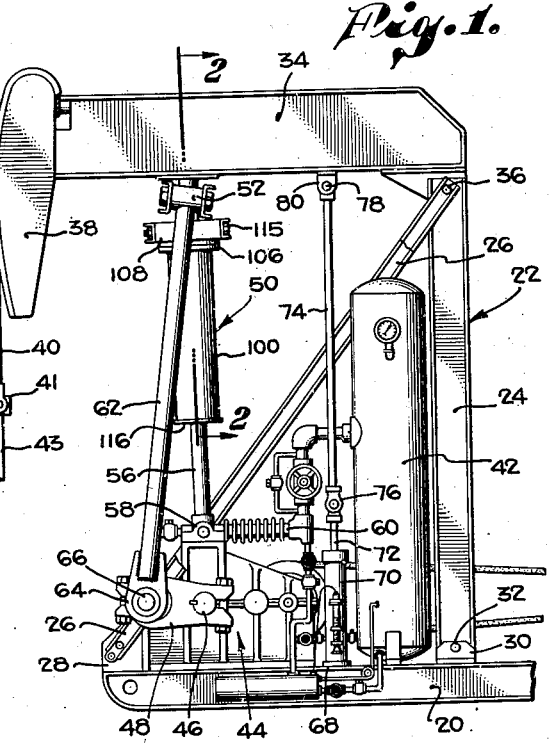
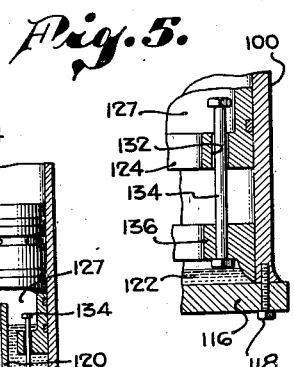
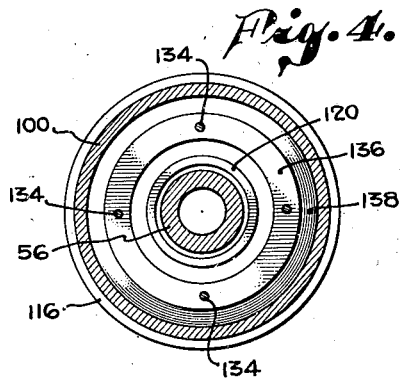
INVENTOR.
Edgar W. Patterson
BY
ATTORNEY Patented Mar. 15, 1949

2,464,710

UNITED STATES PATENT OFFICE 2,464,710

COMPENSATING PISTON LUBRICATOR

Edgar W. Patterson, Downey, Calif.

Application June 30, 1947, Serial No. 758,129

6 Claims. (Cl. 184—18)

This invention relates to air balanced pumping units such as shown in my United States Patent Reissue No. 20,287 and includes among its objects the provision of a collapsible piston oiler for the air balance chamber.

In the prior constructions such as above referred to, an air balance chamber is suspended beneath a pump arm or rocking beam and contains therein a stationary piston or plunger axially traversed by a hollow piston shaft which is in communication with an air reservoir having a constant pressure maintained by suitable pumping means. The balance chamber is moved up and down along the piston by the movement of the rocking beam to counter balance a portion of the weight of the fluid being lifted and the weight of the pump rods. It will be appreciated accordingly that the travel of the piston within the balance chamber varies with the stroke length of the pump. Consequently when operating conditions require a change of pump stroke, this changes the travel of the air balance piston in relation to the oil reservoir.

One of the requirements of such a balance chamber is that the walls adjacent the moving piston be continuously lubricated both to facilitate movement of the piston and also to seal this clearance space against air pressure loss or escape of air therealong. Accordingly an oil reservoir has generally been provided within the base of the chamber, into which the bottom of the piston is disposed to dip at the bottom of each stroke, the immersed end of the piston thus picking up oil which is wiped upward along the side walls to keep the chamber lubricated. However, the change of stroke length of the pumping unit changes the relation of the piston to the oil level in the reservoir and, under certain conditions, the piston does not dip into the oil unless the oil level in the reservoir is raised to accommodate the new stroke length, or travel of the piston.

Checking the oil level is often overlooked when a change of stroke length is made and the air system loses pressure due to the loss of the sealing oil film which is necessary to hold air in a slow speed piston and cylinder of the size necessary to balance a well.

In addition, it should be apparent that it is necessary only for the piston to dip beneath the oil surface for a short distance in order to pick up the required lubricant so that as long as the piston continues to contact the oil, the depth of the latter may be quite shallow. On long stroke pumping units the cylinder and piston and oil reservoir must be quite long to accommodate the variations in stroke length which is not true with this system.

Accordingly by the present invention there is provided an automatically adjusting, variable length piston having a collapsible section which is adapted to dip into such an oil reservoir regardless of changes of stroke length of the piston, and thereby to always continuously lubricate the balance chamber as long as there is any oil in the oil reservoir.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

In the drawings, which form part of the present specification:

Figure 1 is a side elevational view of a pumping unit embodying the present invention;

Fig. 2 is an axial, vertical view partly in elevation taken through the air balance cylinder along the line 2—2 of Figure 1;

Fig. 3 is an axial sectional view along the base of the balance cylinder with the piston shown partly in elevation and positioned at the bottom of its stroke;

Fig. 4 is a transverse sectional view through the piston and balance chamber taken along the line 4—4 of Figure 2; and Fig. 5 is a transverse partial sectional view through the piston and balance chamber, an alternate construction.

As seen particularly in Figure 1, there is provided a pumping unit supported jointly by a generally horizontal base 20, and an identical pair of upwardly extending, parallel members 22 disposed on opposite sides thereof. The individual members 22 are joined together by suitable bracing to form a vertically mounted Sampson post 24 and a pair of angular struts or supports 26, the latter having their ends secured respectively to the top of the upright 24 and adjacent the horizontal base 20, being affixed at the latter point to vertical brackets 28. The lower end of the Sampson post 24 is in turn attached to a pair of mounting shoes 30 of the base by means of a horizontal pin 32.

The conventional, generally horizontal walking beam 34 is pivotally secured at one end to the top of the Sampson post 24 by means of a fulcrum shaft 36 and carries at its opposite end a horsehead 38 over which the reins 40 of a pump polish rod are led into a cross-bar 41 to which the polish rod 43 is attached. The base of the unit is located adjacent the well head in such manner that the horsehead will be located directly thereabove in the conventional manner.

An air reservoir tank 42 is located adjacent the Sampson post and mounted on the base 20. Rotatably journalled in the conventional gear box 44 is a low speed drive shaft 46 to the ends of which is keyed a pair of crank arms 48, one on each side of the gear box. The shaft 46 is operatively connected to a power unit by suitable driving means not shown in detail.

A cylindrical air balance cylinder 50 is pivotally supported by a universal mounting from a cross-head 52 affixed to the underside of the walking beam 34, the balance cylinder being thus adapted to reciprocate vertically along a stationary piston 54 supported within the chamber by a vertically disposed hollow piston rod 56, which is pivotally mounted at its base. The upper end of the hollow piston rod communicates with the cylinder 50 and the lower end of the hollow rod 56 communicates with the air reservoir 42 through the pivotal base 58 and air line 60.

A pair of vertically swinging pitman rods 62 is pivotally secured to the cross-head 52 at its upper end and attached by a terminal crank pin bearing housing 64 to the crank arm 48 by means of a horizontal crank pin 66 mounted in crank arm 48.

Fixedly secured to the base adjacent the air reservoir by means of a footing member 68 is an upright compressor unit 70 having slidably extending from its upper end a piston rod 72 connected to a vertically disposed pair of pitman rods 74 through a cross-head 76, the upper ends of the pitman rods being provided in turn with horizontal trunions 78 transversely disposed in a dependent bracket 80 of the walking beam.

The balance cylinder 50 is constructed of a tubular wall 100 attached to an annular top closure disk 102 by means of vertical bolts 104 inserted through peripheral apertures in the disk and through aligned openings in an outwardly extending flange 106 formed at the top of the piston housing. The disk 102 is secured to the bottom of a suspension unit 108 held on the cross-head 52 by means of a pair of upwardly extending, integral yoke members 110 and 112 journalled on a central shaft 113 of the cross-head, the cross-head in turn being suspended beneath the rocking beam 34 by means of a hanger 114 bolted thereto. The balance cylinder may swing transversely on a longitudinal pin 115 so that universal movement is thus provided by the two axes 113 and 115.

Secured across the bottom face of the piston chamber is a centrally apertured, annular plate 116 attached thereto by screws 118 and bearing an upwardly extending annular collar 120 at its center, adapted to receive therethrough the hollow piston shaft 56. The collar 120 serves to define between its outer face and the inner sides of the piston chamber an annular oil reservoir 122.

As here illustrated, the piston head or plunger 54 mounted on the top of the piston shaft, consists of a generally cylindrical casting 124 press fit on a circumferentially diminished terminal section 126 of the shaft, the plunger extending somewhat further down the housing from the base of the diminished section and being formed with a central cavity 127 opening into the bal- ance chamber at the base of the piston. A number of piston rings 128 axially spaced apart along the outer contacting surface of the plunger act to wipe the inner wall of the piston housing and thus provide a seal therealong.

At the base of the plunger there is formed an inwardly extending, annular shoulder 130 having a series of vertical apertures 132 spaced apart around the circumference thereof and having individually mounted therein, a series of suspension bolts 134. This same result may be attained by a series of lugs. The lower ends of the bolts are received in a corresponding series of vertical apertures formed in an annulus 136 having similar dimensions to the lower shouldered extremity of the plunger and being axially spaced below therefrom a distance corresponding to the length of the suspension bolts. Both the shoulder 130 and the annulus 136 are radially spaced outward from the piston shaft 56.

The upper outer edge of the annulus is cut away so as to form an annular oil pocket 138 therealong adjacent the wall of the piston housing. Alternatively, the piston extension may be as shown in Figure 5 in which the annular oil pocket 138 is omitted and where the oil on the annulus may drain toward the cylinder wall and deposit a film of oil on the cylinder wall, so that upon this annulus being immersed in the oil reservoir 122 upon the down stroke of the plunger, oil will cling to the slanting surface on the inside of the bottom of the annulus 136 and will drain down this slanting surface to the cylinder wall and this oil will be thus deposited along the cylinder wall as the plunger is raised. This alternative is used if the desired depth of the oil in the reservoir 122 is shallow, as in Figure 5, and not deep enough to permit the annulus 136 to be immersed and fill an annular oil pocket on top of the annulus, as at 138 in Figures 2 and 3. This alternative shown in Figure 5 is adequate for lubricating the cylinder walls when the oil level in reservoir 122 is shallow, as in Figure 5. It will be seen also that upon the annulus abutting against the lower plate 116 of the cylinder housing, and the plunger being pushed down yet further, the suspension bolts 134 will move upward into the central cavity 127 of the piston head, or in other words the two portions of the plunger 124 and 136 will be collapsed together as shown particularly in Figure 3.

At the upper face of the plunger there is formed an annular well 142, the outer edge of which comprises a radiused lip 144 adapted to channel into the well, oil wiped from the cylinder walls by the upward movement of the piston. An annular cover plate 146 is mounted at the top of the well 142 with its outer edge spaced inward a short distance from the radiused lip 144 and disposed substantially flush with the air inlet 147 at the center of the piston shaft, the cover thereby preventing air moving through the hollow shaft from picking up or blowing away the oil in the cup 142. At the same time, the film of oil maintained between the moving piston and the cylinder wall prevents air leaking therealong. Provision is also made for return to the lower reservoir 122 of oil gathered in the cup 142, by means of radial outlets 148 drilled into the base of the cup from a peripheral groove 150 in the side wall of the plunger.

It will thus be seen that I have produced a self-adjusting piston oiler which automatically compensates for varied stroke length of the drive shaft 46 or rocking beam 34 and facilitates a constant and even flow or film of lubricant along the cylinder walls.

While I have shown and described in some detail a presenting preferred embodiment of my self-adjusting piston oiler, it is to be understood that various modifications may be made in the construction and operation thereof within the spirit and scope of the subsequently claimed invention which is to be construed broadly and limited only by the prior art.

I claim:

1. In a variable stroke pumping unit having a piston chamber, a variable stroke piston mounted for reciprocal movement therein, and an open topped lubricant reservoir disposed within the chamber adjacent its base, the improvement comprising in combination therewith: a member having an outer perimeter corresponding to that of the piston and adapted to wipe the chamber wall, said member being slideably disposed beneath the piston within the chamber and being axially spaced from said piston by retractable means.

2. In a variable stroke pumping unit having a piston chamber, a variable stroke piston mounted for reciprocal movement therein, and an open topped lubricant reservoir disposed within the chamber adjacent its base, the improvement comprising in combination therewith: a member having an outer perimeter corresponding to that of the piston and adapted to wipe the chamber wall, said member being slideably disposed beneath the piston within the chamber and being axially spaced from said piston by retractable means, said retractable means being adapted to permit the member to be dipped into the lubricant during every stroke length of the pumping unit.

3. In a variable stroke pumping unit having a piston chamber, a variable stroke piston mounted for reciprocal movement therein, and an open topped lubricant reservoir disposed within the chamber adjacent its base, the improvement comprising in combination therewith: a member having an outer perimeter corresponding to that of the piston and adapted to wipe the chamber wall, said member being slideably disposed beneath the piston within the chamber and being axially spaced from said piston by retractable means, said retractable means being adapted to permit the member to be dipped into the lubricant during every stroke length of the pumping unit, said member having a lubricant retaining, peripheral groove formed along its upper edge adjacent the cylinder wall.

4. In a variable stroke pumping unit having a piston chamber, a variable stroke piston mounted for reciprocal movement therein, and an open topped lubricant reservoir disposed within the chamber adjacent its base, the improvement comprising in combination therewith: a member having an outer perimeter corresponding to that of the piston and adapted to wipe the chamber wall, said member being slideably disposed beneath the piston within the chamber and being axially spaced from said piston by retractable means, said retractable means comprising a plurality of longitudinal suspension pins disposed jointly in aligned apertures in the piston and in said member and adapted to move upward into a cavity in said piston upon further downward movement of the piston after said member is seated in the reservoir.

5. In a variable stroke pumping unit having a piston chamber, a variable stroke piston mounted for reciprocal movement therein, and an open topped lubricant reservoir disposed within the chamber adjacent its base, the improvement comprising in combination therewith: a member having an outer perimeter corresponding to that of the piston and adapted to wipe the chamber wall, said member being slideably disposed beneath the piston within the chamber and being axially spaced from said piston by retractable means, said retractable means being adapted to permit the member to be dipped into the lubricant during every stroke length of the pumping unit, said retractable means comprising a plurality of longitudinal suspension pins disposed jointly in aligned apertures in the piston and in said member and adapted to move upward into a cavity in said piston upon further downward movement of the piston after said member is seated in the reservoir.

6. In a variable stroke pumping unit having a piston chamber, a variable stroke piston mounted for reciprocal movement therein, and an open topped lubricant reservoir disposed within the chamber adjacent its base, the improvement comprising in combination therewith: a member having an outer perimeter corresponding to that of the piston and adapted to wipe the chamber wall, said member being slideably disposed beneath the piston within the chamber and being axially spaced from said piston by retractable means, said retractable means being adapted to permit the member to be dipped into the lubricant during every stroke length of the pumping unit, said member having a lubricant retaining, peripheral groove formed along its upper edge adjacent the cylinder wall, said retractable means comprising a plurality of longitudinal suspension pins disposed jointly in aligned apertures in the piston and in said member and adapted to move upward into a cavity in said piston upon further downward movement of the piston after said member is seated in the reservoir.

EDGAR W. PATTERSON.

REFERENCES CITED

The following references are of record in the file of this patent:

UNITED STATES PATENTS

| Number | Name | Date |
| --- | --- | --- |
| 1,227,845 | Sleicher | May 29, 1917 |
| 1,396,666 | Rix | Nov. 8, 1921 |
| 2,255,568 | Page | Sept. 9, 1941 |